(12) United States Patent
Pyo et al.

(10) Patent No.: US 8,132,972 B2
(45) Date of Patent: Mar. 13, 2012

(54) OPTICAL CONNECTOR FOR CONTACTLESS COMMUNICATION, OPTICAL ADAPTER FOR CONTACTLESS COMMUNICATION, AND METHOD OF MANUFACTURING ELECTRONIC APPLIANCE USING THE SAME

(75) Inventors: Se-jin Pyo, Suwon-si (KR); Tae-hong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 12/388,569

(22) Filed: Feb. 19, 2009

(65) Prior Publication Data
US 2010/0046893 A1 Feb. 25, 2010

(30) Foreign Application Priority Data
Aug. 25, 2008 (KR) .................. 10-2008-0083090

(51) Int. Cl.
*G02B 6/36* (2006.01)

(52) U.S. Cl. ............................................. 385/88; 385/92
(58) Field of Classification Search .................. 385/88, 385/92
See application file for complete search history.

(56) References Cited

U.S. PATENT DOCUMENTS

| 6,309,566 B1* | 10/2001 | Muller et al. ............... 264/1.25 |
| 2003/0118312 A1* | 6/2003 | Sobel et al. .................. 385/135 |
| 2005/0008299 A1* | 1/2005 | Ohe et al. ........................ 385/53 |
| 2007/0116415 A1* | 5/2007 | Kobayashi .................... 385/116 |
| 2007/0270017 A1* | 11/2007 | Hardacker et al. ............ 439/357 |

* cited by examiner

*Primary Examiner* — Ryan Lepisto
*Assistant Examiner* — Jerry Blevins
(74) *Attorney, Agent, or Firm* — Sughrue Mion, PLLC

(57) ABSTRACT

An optical connector for contactless communication is provided. The optical connector includes an optical output part through which an optical signal is output; a first housing which is attached to a board of an electronic appliance and supports the optical output part so that the optical output part protrudes from the first housing to perform contactless communication; and a second housing which is removably attached to the first housing to surround the optical output part.

13 Claims, 7 Drawing Sheets

OPTICAL CONNECTOR FOR CONTACTLESS COMMUNICATION, OPTICAL ADAPTER FOR CONTACTLESS COMMUNICATION, AND METHOD OF MANUFACTURING ELECTRONIC APPLIANCE USING THE SAME

CROSS-REFERENCE TO RELATED APPLICATIONS

This application claims priority from Korean Patent Application No. 10-2008-0083090, filed Aug. 25, 2008 in the Korean Intellectual Property Office, the entire disclosure of which is incorporated herein by reference.

BACKGROUND OF THE INVENTION

1. Field of the Invention

Apparatuses and methods consistent with the present invention relate to an optical connector, and more particularly, to an optical connector and an optical adapter for contactless communication.

2. Description of the Related Art

An optical connector is a device used in an electronic appliance to input/output a digital signal. Through connection of an optical cable to an optical connector provided on the electronic appliance, the input/output of an optical signal becomes possible. At one end of the optical cable, an optical plug to be inserted into the optical connector is provided, and after the optical plug is connected to an optical output part provided inside the optical connector, optical signal communication is performed. The related art optical connector as described above has been used for the purpose of wire communication, but not for the purpose of contactless communication.

In a process of manufacturing an electronic appliance, it is sometimes required to perform communication between the electronic appliance and a process system. For example, a result of a quality test stored in the electronic appliance may be transferred to the process system. Specifically, during the process of manufacturing the electronic appliance, several tens of quality tests are performed with respect to the electronic appliance. The result of such a quality test is stored in the electronic appliance, and it is sometimes required to transfer the result of the quality test stored in the electronic appliance to the process system. For this, it is required to prepare a separate communication device, and it is preferable that contactless communication is performed in consideration of process automation. However, the related art optical connector has been used only for the input/output of a digital signal in a manufactured electronic appliance, but has not been used for contactless communication required in the process of manufacturing the electronic appliance.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of embodiments of the present invention is to provide an optical connector for contactless communication.

Another aspect of embodiments of the present invention is to provide an optical adapter for contactless communication.

Still another aspect of embodiments of the present invention is to provide a method of manufacturing an electronic appliance using the optical connector for contactless communication.

Still another aspect of embodiments of the present invention is to provide method of manufacturing an electronic appliance using the optical adapter for contactless communication.

The foregoing and other objects and advantages are substantially realized by providing an optical connector, according to embodiments of the present invention, which includes an optical output part to output an optical signal; a first housing attached to a board of an electronic appliance to support the optical output part to protrude to allow contactless communication; and a second housing removably attached to the first housing to surround the optical output part.

The second housing may be attached to the first housing after completion of the contactless communication through the optical output part.

The optical output part may include an optical signal amplifying part to amplify the optical signal for the contactless communication.

The second housing may include an opening into which an optical plug is inserted.

The second housing may further include a shutter to open/close the opening; and an elastic member to elastically bias the shutter in a direction of closing the opening.

The optical connector may further include a stopper attached to the opening to close the opening.

The foregoing and other objects and advantages are substantially realized by providing an optical adapter for contactless communication, including an optical signal connection part connected to an optical output part provided in an optical connector to receive an optical signal from the optical output part; and a protruding type optical output part formed to protrude to allow contactless communication and to output the optical signal received from the optical signal connection part.

The optical signal connection part may be inserted into an opening of the optical connector and may be connected to the optical output part.

The optical adapter for the contactless communication may be removed from the optical connector after completion of the contactless communication.

The foregoing and other objects and advantages are substantially realized by providing a method of manufacturing an electronic appliance, including a first housing attachment operation of attaching a first housing, which supports an optical output part outputting an optical signal to protrude to allow contactless communication, to a board of the electronic appliance; a contactless communication operation of performing the contactless communication through the optical output part; and a second housing attachment operation of attaching a second housing that surrounds the optical output part to the first housing after completion of the contactless communication.

The contactless communication operation may include an optical signal transmission operation of transmitting a specified optical signal through the optical output part; and an optical signal reception operation of receiving the specified optical signal through an optical signal reception part that is apart for a predetermined distance from the optical output part.

The specified optical signal may correspond to a result of a quality test of the electronic appliance.

The optical output part may include an optical signal amplification part, and the optical signal transmission operation may include a transmitted optical signal amplification operation of amplifying the specified optical signal to be transmitted through the optical signal amplification part.

The optical signal reception part may include an optical signal amplification part, and the optical signal reception operation may include a received optical signal amplification operation of amplifying the received optical signal through the optical signal amplification part.

The foregoing and other objects and advantages are substantially realized by providing a method of manufacturing an electronic appliance provided with an optical connector attached to a board of the electronic appliance and having an optical output part installed therein to output an optical signal, the method including a contactless communication optical adapter insertion operation of inserting an optical adapter for contactless communication, which is connected to the optical output part provided in the optical connector and includes a protruding type optical output part projectingly formed to perform the contactless communication, into the optical connector; a contactless communication operation of performing the contactless communication through the optical adapter for the contactless communication; and a contactless communication optical adapter removal operation of removing the optical adapter for the contactless communication from the optical connector.

The optical adapter for the contactless communication may include an optical signal connection part connected to the optical output part provided in the optical connector to receive an optical signal from the optical output part, and the protruding type optical output part outputs the optical signal received from the optical signal connection part.

The contactless communication operation may include an optical signal transmission operation of transmitting a specified optical signal through the protruding type optical output part; and an optical signal reception operation of receiving the specified optical signal output from the protruding type optical output part through an optical signal reception part that is apart for a predetermined distance from the protruding type optical output part.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
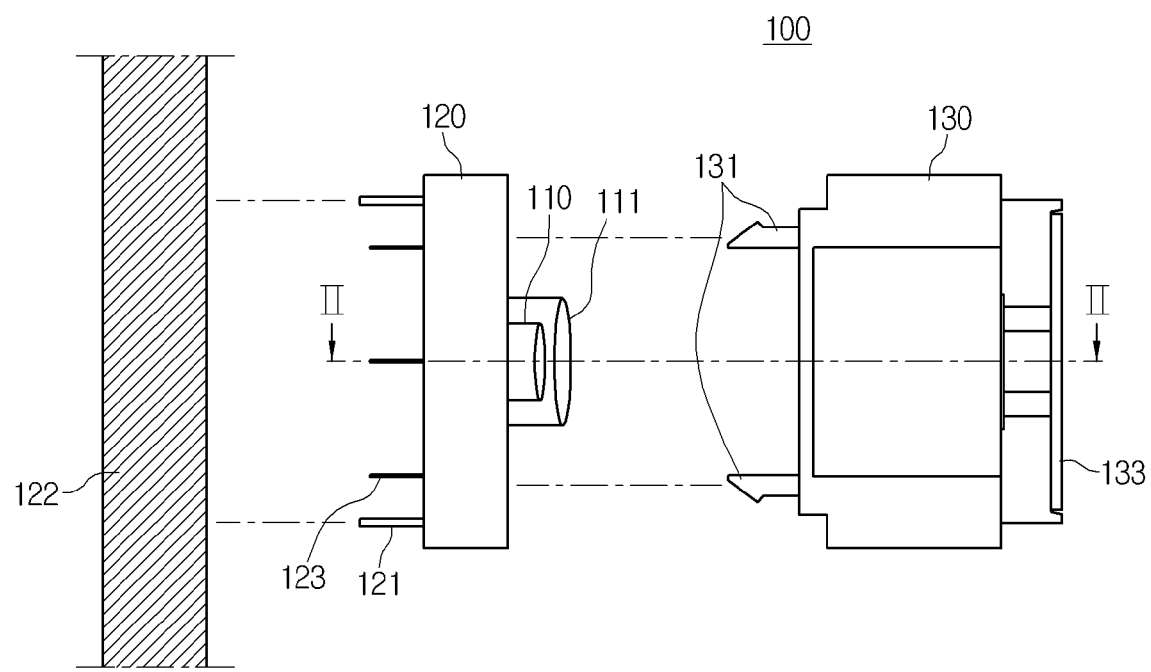
FIG. 1 is a plan view of an optical connector according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 2:
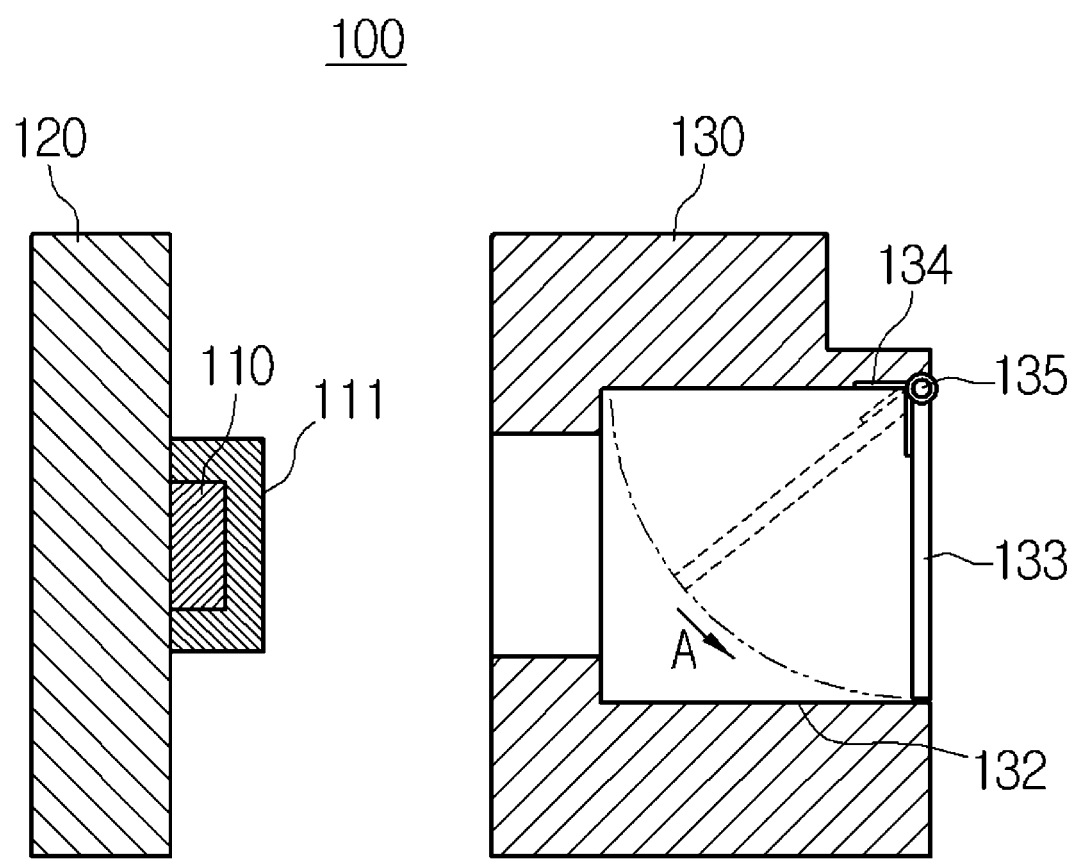
FIG. 2 is a sectional view of the optical connector of FIG. 2.

FIG. 1 is a plan view of an optical connector 100 according to an exemplary embodiment of the present invention, and FIG. 2 is a sectional view of the optical connector 100 of FIG. 2.

The optical connector 100 according to an exemplary embodiment of the present invention includes an optical output part 110, a first housing 120, and a second housing 130.

The optical output part 110 outputs an optical signal, and is composed of a general optical element. The optical output part 110 is connected to an optical cable (not illustrated), and performs optical signal communication. The optical output part 110 includes an optical signal amplification part 111 amplifying an optical signal. By the optical signal amplification part 111, smoother contactless communication and wire communication become possible. The optical signal amplification part 111 may be composed of a lens increasing the intensity of light output from the optical output part 110.

The first housing 120 supports the optical output part 110 to protrude to allow the contactless communication. In order to make the contactless communication possible, it is required to shorten the distance between the optical output part 110 and an optical signal reception part 200 (See FIG. 3) receiving the optical signal transmitted from the optical output part 110. The strength of the optical signal output from the optical output part that is used in a general optical connector is not sufficient to perform the contactless communication. Accordingly, even if the optical output part is spaced slightly apart from the optical signal reception part, it is impossible to perform smooth contactless communication. In order to increase the strength of the optical signal, the manufacturing cost may be increased. In an exemplary embodiment of the present invention, the optical output part 110 is projectingly formed to secure a distance required to perform the contactless communication.

The first housing 120 is attached to a board 122 of the electronic appliance by a board fixing part 121. The optical output part 110 is electrically connected to an electronic circuit of the board 122 by board connection pins 123 formed on the first housing 120.

The second housing 130 is removably attached to the first housing 120 by a connection part 131. Before the second housing 130 is attached to the first housing 120, contactless communication can be performed by the protruded optical output part 110. After completion of the contactless communication, the second housing 130 is attached to the first housing 120 to surround the optical output part 110, and thus the optical output part 110 can be protected from an external impact or foreign substances such as dust. The second housing 130 includes an opening 132, a shutter 133, an elastic member 134.

An optical plug formed at one end of the optical cable is inserted through the opening 132.

The shutter 133 opens/closes the opening 132, and is rotatable against a hinge axis 135.

The elastic member 134 elastically biases the shutter 133 in a direction of closing the opening 132 (i.e., direction "A" in FIG. 2). Accordingly, in the case where the optical plug is not inserted into the opening 132, the opening 132 is closed by the shutter 133. In this case, the optical output part 110 can be protected from an external impact or foreign substances such as dust. In the case where the optical plug is inserted, the shutter 133 is rotated as indicated as a dotted line in FIG. 2, and thus the optical plug and the optical output part 110 can be connected to each other.

Hereinafter, a method of manufacturing an electronic appliance using the optical connector 100 for contactless communication as described above will be described in detail.

The method of manufacturing an electronic appliance using the optical connector 100 for contactless communication according to an exemplary embodiment of the present invention includes a first housing attachment operation, a contactless communication operation, and a second housing attachment operation.

In the first housing attachment operation, the first housing 120 supporting the optical output part 110 to protrude, which outputs the optical signal for the contactless communication, is attached to the board 122 of the electronic appliance. In this case, the first housing 120 is fixed to the board 122 by the board fixing part 121 formed on the first housing 120. The optical output part 110 and the electronic circuit of the board 122 are electrically connected to the board connection pins 123.

Figure 3:
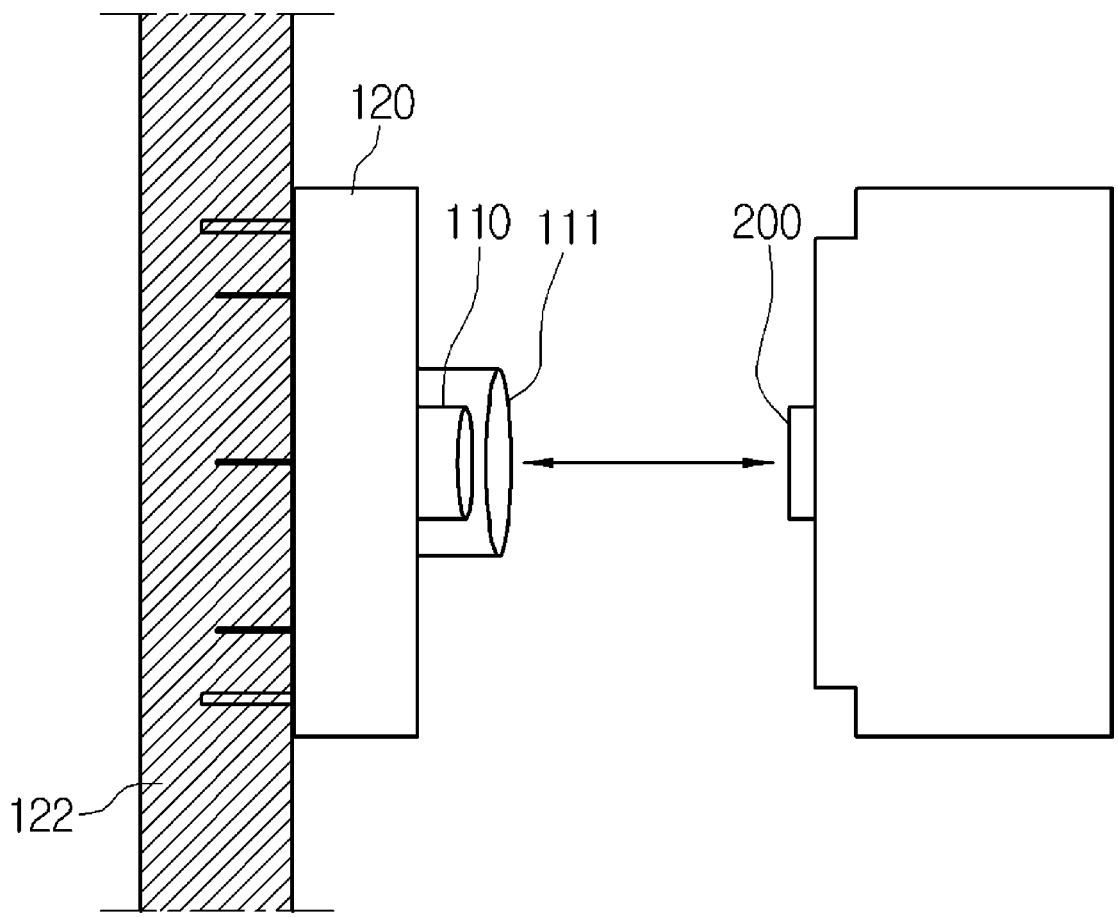
FIGS. 3 and 4 are views schematically illustrating a contactless communication operation between an optical connector and an optical signal reception part.

In the contactless communication operation, the contactless communication is performed between the protruded optical output part 110 and the optical signal reception part 200. FIG. 3 illustrates the contactless communication operation. Generally, it may be required to perform the communication between the electronic appliance and the process system during a manufacturing process of the electronic appliance. The most representative case is that a result of a quality test stored in the electronic appliance is transferred to the process system. The process system performs quality management of the electronic appliance using the result of the quality test. However, the communication is not limited thereto, and diverse information communications can be performed between the electronic appliance and the process system in the process of manufacturing the electronic appliance. In an exemplary embodiment of the present invention, since the contactless communication is performed between the optical output part 110 and the optical signal reception part 200 without the necessity of attaching or detaching the wire cable, the process automation becomes possible. Also, damage of the optical connector 100 which may occur due to the attachment/detachment of the wire cable can be prevented.

The contactless communication operation includes an optical signal transmission operation and an optical signal reception operation.

In the optical signal transmission operation, the optical output part 110 transmits a specified optical signal. As described above, the specified optical signal may correspond to the result of the quality test of the electronic appliance that is in the manufacturing process. In this case, the electronic circuit on the board 122 of the electronic appliance converts the result of the quality test into an optical signal, and the optical output part 110 transmits the optical signal to the optical signal reception part 200. The optical signal transmission operation includes a transmitted optical signal amplification operation In the transmitted optical signal amplification operation, the optical signal amplification part 111 amplifies the specified optical signal to be transmitted. Accordingly, a contactless communication becomes possible.

Figure 4:
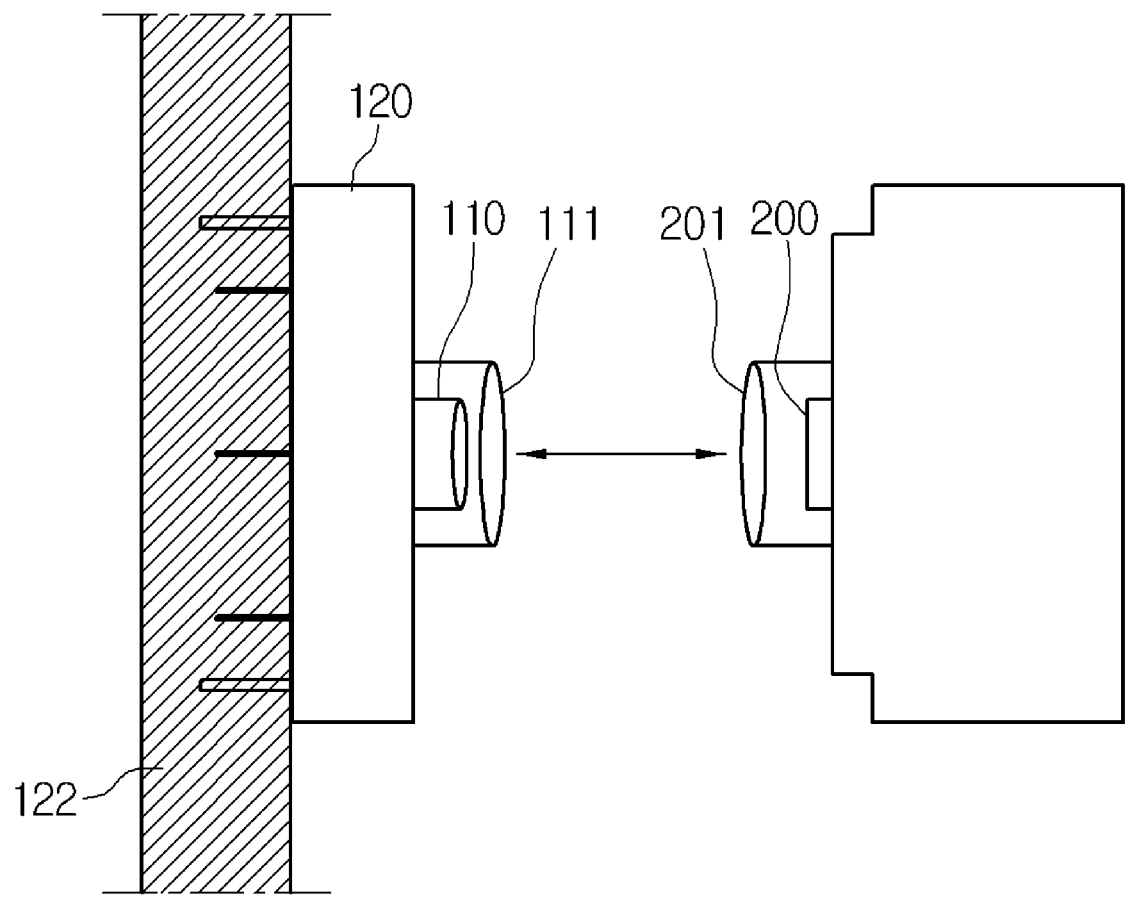

In the optical signal reception operation, the optical signal reception part 200 receives the specified optical signal transmitted by the optical output part 110 as the optical signal reception part 200 is apart for a predetermined distance from the optical output part 110. The optical signal reception operation includes a received optical signal amplification operation. For this, as illustrated in FIG. 4, the optical signal reception part 200 includes an optical signal amplification part 201.

In the received optical signal amplification operation, the optical signal amplification part 201 amplifies the received optical signal. Accordingly, a contactless communication becomes possible.

In the second housing attachment operation, the second housing 130 surrounding the optical output part 110 is attached to the first housing 120. The second housing attachment operation is performed after the completion of the contactless communication operation as described above.

After the completion of the second housing attachment operation, the optical connector 100 may be used for the purpose of a wire communication with an external electronic appliance. That is, if an optical cable is connected to the optical connector 100, a digital signal that is processed by the electronic appliance is input and output. As described above, according to an exemplary embodiment of the present invention, the optical connector is used for the purpose of the contactless communication between the electronic appliance and the process system in the process of manufacturing the electronic appliance, while after the completion of the electronic appliance, it is used for the purpose of the wire communication with an external electronic appliance. Since the contactless communication can be performed using the optical connector 100 to be installed on the electronic appliance, without the necessity of preparing a separate communication device for the contactless communication between the electronic appliance and the process system, the manufacturing process is simplified and the manufacturing cost is reduced.

Figure 5:
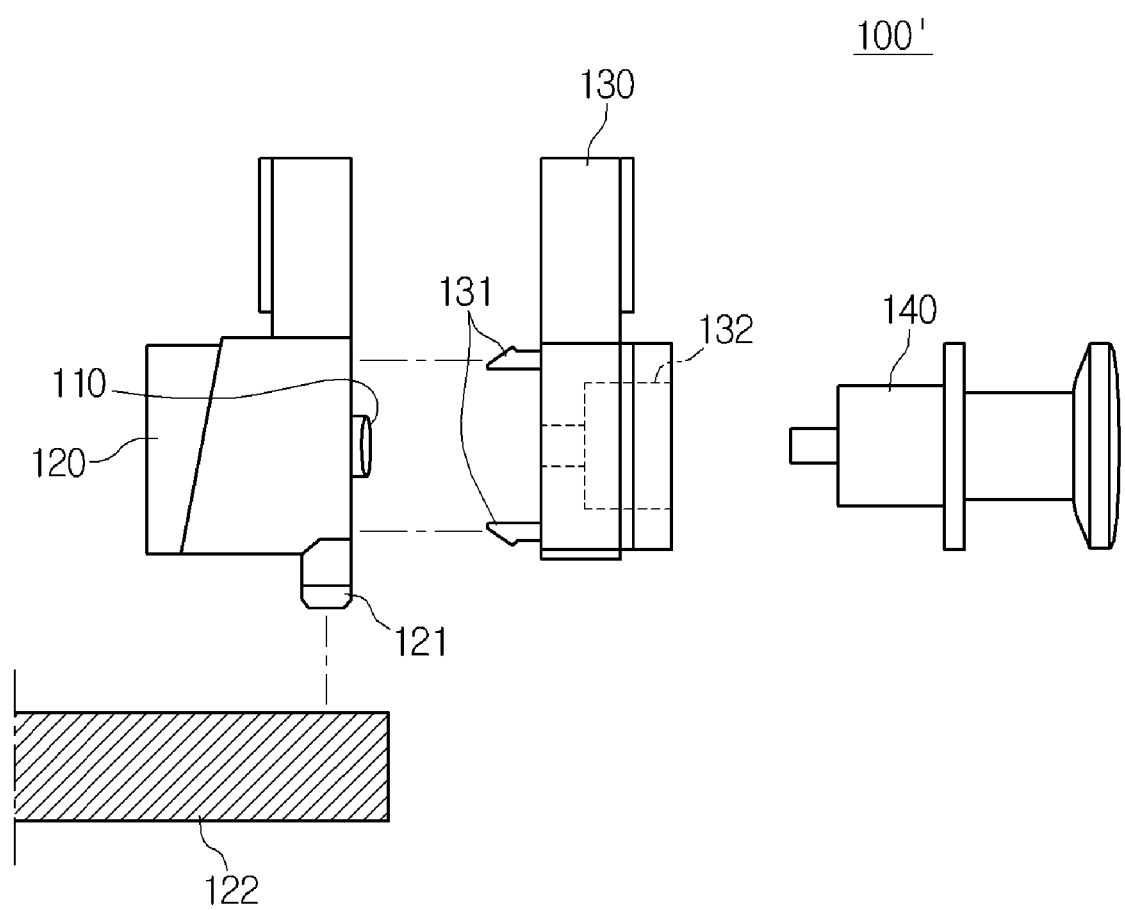
FIG. 5 is a side view of an optical connector according to another exemplary embodiment of the present invention.

FIG. 5 is a side view of an optical connector 100' according to another exemplary embodiment of the present invention. Hereinafter, the optical connector 100' according to another exemplary embodiment of the present invention will be described with reference to FIG. 5. In the following description, same reference numerals are given for the same constituent elements, and the detailed description related to the same constituent elements will be omitted.

The optical connector 100' according to another exemplary embodiment of the present invention includes an optical output part 110, a first housing 120, a second housing 130, and a stopper 140.

The functions of the optical output part 110, the first housing 120, and the second housing 130 are substantially the same as those in the previous exemplary embodiment of the present invention. That is, the first housing 120 supports the optical output part 110 to protrude to allow the contactless communication, and the second housing surrounding the optical output part 110 is removably attached to the first housing 120. In FIG. 5, the board connection pins electrically connecting the optical output part 110 to the electronic circuit of the board 122 are hidden by the board fixing part 121 and are not illustrated. Unlike the optical connector 100 as described above, the optical connector 100' as illustrated in FIG. 5 includes a stopper 140.

The stopper 140 is inserted into the opening 132 formed in the second housing 130 to close the opening 132. If the stopper 140 is inserted into the opening 132, the optical output part 110 can be protected from an external impact or foreign substances such as dust. According to the optical connector 100 in the previous exemplary embodiment, if the optical plug is not inserted into the opening 132, the shutter 133 closes the opening 132 by the elastic member 134. According to the optical connector 100' in the current exemplary embodiment, a user should manually insert the stopper 140 into the opening 132.

Since the method of manufacturing the electronic appliance using the optical connector 100' for the contactless communication according to the current exemplary embodiment is substantially the same as that according to the previous exemplary embodiment, the detailed description thereof will be omitted.

Hereinafter, the optical adapter 300 for contactless communication according to an exemplary embodiment of the present invention will be described.

Figure 6A:
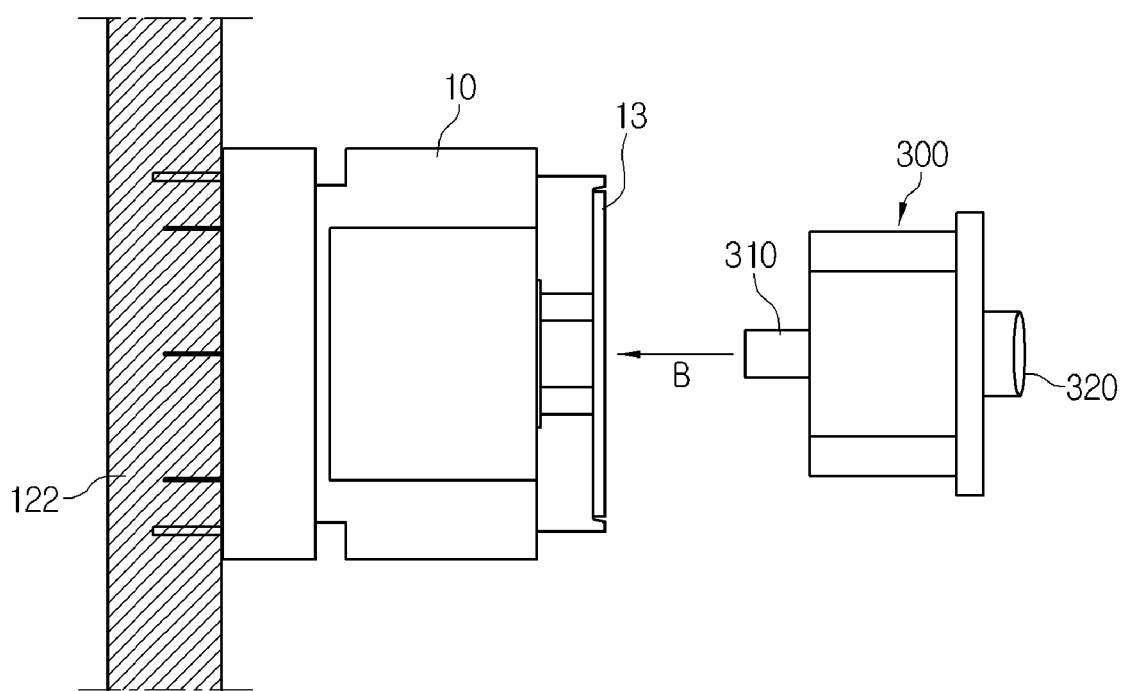
FIG. 6A is a plan view of an optical adapter for contactless communication according to an exemplary embodiment of the present invention.
Figure 6B:
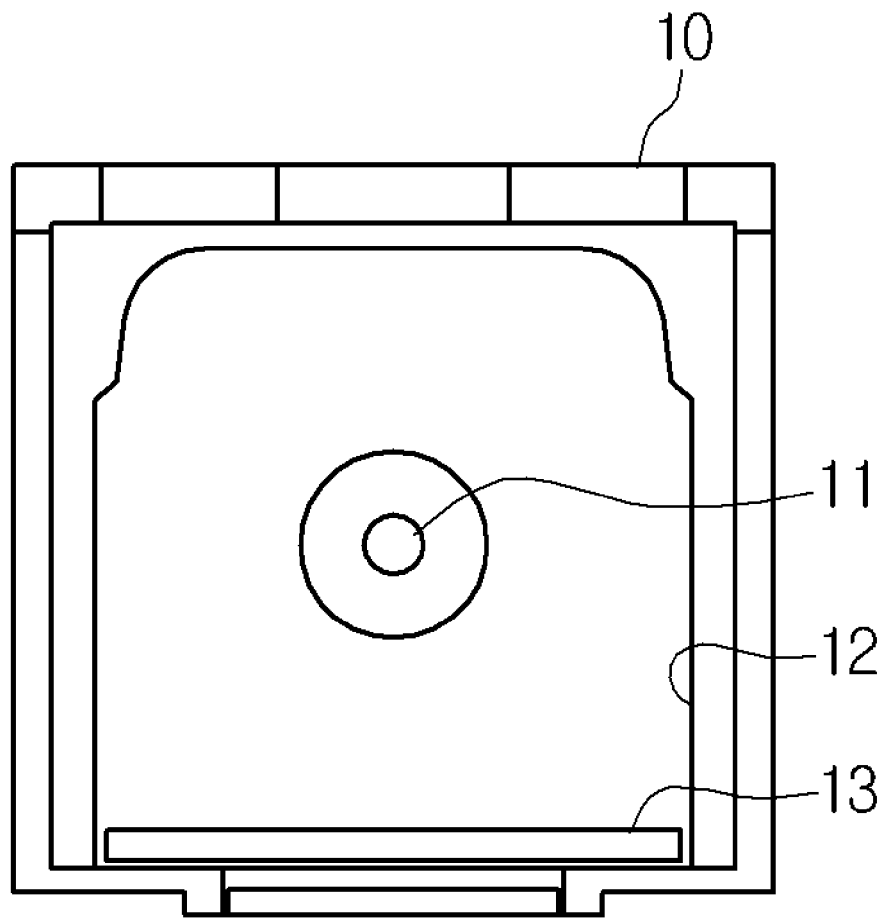
FIG. 6B is a front view of a general optical connector into which an optical adapter for contactless communication is inserted.

FIG. 6A is a plan view of an optical adapter 300 for contactless communication according to an exemplary embodiment of the present invention, and FIG. 6B is a front view of a general optical connector 10 into which the optical adapter 300 for contactless communication is inserted. FIG. 6B illustrates a case that a shutter 13 of the general optical connector 10 is open.

Unlike the optical connectors 100 and 100' according to the exemplary embodiments described above, the general optical connector 10 includes an optical output part 11 (See FIG. 6B) installed therein, and thus the optical output part 11 is spaced apart from the optical signal reception part 200. Accordingly, a distance required for the contactless communication cannot be secured. Also, since the shutter 13 blocks an opening 12 of the optical output part 11, the contactless communication becomes impossible. However, if the optical adapter 300 for the contactless communication is inserted into the opening 12 of the optical connector 10, the contactless communication becomes possible. The optical adapter 300 for the contactless communication includes an optical signal connection part 310 and a protruding type optical output part 320.

The optical signal connection part 310 is connected to the optical output part 11 installed inside the optical connector 10 to receive the optical signal from the optical output part. That is, if the optical adapter 300 for the contactless communication is inserted into the opening 12 of the optical connector 10 in a direction B as illustrated in FIG. 6A, the shutter 13 is open as illustrated in FIG. 6B, and the optical signal connection part 310 is connected to the optical output part 11 of the optical connector 10.

The protruding type optical output part 320 is connected to the optical signal connection part 310 to output the optical signal received from the optical signal connection part 310. Since the protruding type optical output part 320 is projectingly formed, the distance required for the contactless communication can be secured.

After the completion of the contactless communication between the electronic appliance and the process system, the optical adapter 300 for the contactless communication is removed from the optical connector 10.

The method of manufacturing an electronic appliance using the optical adapter 300 for the contactless communication according to an exemplary embodiment of the present invention includes a contactless communication optical adapter insertion operation, a contactless communication operation, and a contactless communication optical adapter removal operation.

In the contactless communication optical adapter insertion operation, the optical adapter 300 for the contactless communication as described above is inserted into the optical connector 10. In this case, the optical output part 11 installed in the optical connector 10 and the optical signal connection part 310 are connected to each other. The protruding type optical adapter 320 connected to the optical signal connection part 310 outputs the optical signal received from the optical signal connection part 310.

In the contactless communication operation, the contactless communication is performed between the protruding type optical output part 320 and the optical signal reception part 200. Since the details of the contactless communication operation are substantially the same as those as described above, the detailed description thereof will be omitted.

In the contactless communication operation, the optical adapter 300 for the contactless communication is removed from the optical connector 10 after completion of the contactless communication operation.

As described above, if the optical adapter 300 for the contactless communication according to the exemplary embodiment is used, the contactless communication becomes possible even in the general optical connector 10.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An optical connector comprising:
   an optical output part through which an optical signal is output;
   a first housing which is attached to a board of an electronic appliance and supports the optical output part so that the optical output part protrudes from the first housing to perform contactless communication; and
   a second housing which is removably attached to the first housing to surround the optical output part; and
   wherein the optical part comprises an optical signal amplifying part which amplifies the optical signal for the contactless communication.

2. The optical connector of claim 1, wherein the second housing is attached to the first housing after completion of the contactless communication through the optical output part.

3. The optical connector of claim 1, wherein the second housing comprises an opening into which an optical plug is inserted.

4. The optical connector of claim 3, wherein the second housing further comprises:
   a shutter to open and close the opening; and
   an elastic member which elastically biases the shutter in a direction of closing the opening.

5. The optical connector of claim 3, further comprising:
   a stopper which is inserted into the opening to close the opening.

6. A method of manufacturing an electronic appliance, the method comprising:
   attaching a first housing to a board of the electronic appliance, the first housing supporting an optical output part that protrudes from the first housing;
   performing contactless communication through the optical output part which outputs an optical signal; and
   attaching a second housing that surrounds the optical output part to the first housing after the performing the contactless communication is completed;
   wherein the performing the contactless communication comprises:
   transmitting the optical signal through the optical output part; and receiving the optical signal through an optical signal reception part that is spaced apart a predetermined distance from the optical output part; and wherein the optical signal corresponds to a result of a quality test of the electronic appliance.

7. The method of claim 6, wherein the optical output part comprises an optical signal amplification part, and the transmitting the optical signal comprises amplifying the optical signal via the optical signal amplification part.

8. The method of claim 6, wherein the optical signal reception part comprises an optical signal amplification part, and the receiving the optical signal comprises amplifying the received optical signal via the optical signal amplification part.

9. A method of manufacturing an electronic appliance provided with an optical connector attached to a board of the electronic appliance and having an optical output part installed therein to output an optical signal, the method comprising:

inserting an optical adapter into the optical connector, the optical adapter being connected to the optical output part provided in the optical connector and including a protruding type optical output part which projects from the optical adapter;

performing contactless communication through the optical adapter; and removing the optical adapter from the optical connector after the performing the contactless communication is completed;

wherein the performing the contactless communication operation comprises:

transmitting the optical signal through the protruding type optical output part; and receiving the optical signal transmitted through the protruding type optical output part through an optical signal reception part that is spaced apart a predetermined distance from the protruding type optical output part; and wherein the optical signal corresponds to a result of a quality test of the electronic appliance.

10. The method of claim 9, wherein the optical adapter comprises an optical signal connection part connected to the optical output part provided in the optical connector to receive an optical signal from the optical output part, and the protruding type optical output part outputs the optical signal received from the optical signal connection part.

11. The method of claim 9, wherein the protruding type optical output part comprises an optical signal amplification part, and the transmitting the optical signal comprises amplifying the optical signal transmitted through the optical signal amplification part.

12. The method of claim 9, wherein the optical signal reception part comprises an optical signal amplification part, and the receiving the optical signal comprises amplifying the received optical signal through the optical signal amplification part.

13. An optical connector comprising:

a first housing including an optical output part which protrudes from the first housing; and a second housing which is attachable to the first housing, wherein the optical output part amplifies and outputs an optical signal to perform contactless communication when the second housing is not attached to the first housing, and wherein the second housing surrounds the optical output part when the second housing is attached to the first housing.

* * * * *